US008719722B2

(12) United States Patent
Kuno et al.

(10) Patent No.: US 8,719,722 B2
(45) Date of Patent: May 6, 2014

(54) PRODUCING A REPRESENTATION OF PROGRESS OF A DATABASE PROCESS

(75) Inventors: Harumi Kuno, Cupertino, CA (US); Umeshwar Dayal, Saratoga, CA (US); William K. Wilkinson, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 784 days.

(21) Appl. No.: 12/721,431

(22) Filed: Mar. 10, 2010

(65) Prior Publication Data

US 2011/0225533 A1    Sep. 15, 2011

(51) Int. Cl.
G06F 3/00    (2006.01)
G06F 7/00    (2006.01)

(52) U.S. Cl.
USPC ........................................... 715/772; 707/719

(58) Field of Classification Search
USPC .................................................. 715/771, 772
See application file for complete search history.

(56) References Cited

U.S. PATENT DOCUMENTS

| | | | |
|---|---|---|---|
| 5,806,059 | A | 9/1998 | Tsuchida et al. |
| 6,301,580 | B1 | 10/2001 | Eigel-Danielson |
| 7,356,524 | B2 | 4/2008 | Zurek et al. |
| 7,401,076 | B2 | 7/2008 | Davis |
| 7,493,337 | B2 | 2/2009 | Chaudhuri et al. |
| 2003/0177137 | A1 | 9/2003 | MacLeod et al. |
| 2004/0010488 | A1 | 1/2004 | Chaudhuri et al. |
| 2005/0097103 | A1 | 5/2005 | Zane et al. |
| 2005/0222965 | A1 | 10/2005 | Chaudhuri et al. |
| 2005/0267877 | A1 | 12/2005 | Chaudhuri et al. |
| 2006/0026179 | A1 | 2/2006 | Brown et al. |
| 2006/0190310 | A1 | 8/2006 | Gudla et al. |
| 2006/0190430 | A1 | 8/2006 | Luo et al. |
| 2006/0200451 | A1 | 9/2006 | Kosura et al. |
| 2006/0282404 | A1 | 12/2006 | Chaudhuri et al. |
| 2007/0143246 | A1 | 6/2007 | Bestgen et al. |
| 2008/0133458 | A1 | 6/2008 | Zabback et al. |
| 2008/0177722 | A1* | 7/2008 | Lohman et al. ............... 707/4 |

OTHER PUBLICATIONS

Surajit Chaudhuri et al, "Estimating Progress of Execution for SQL Queries", SIGMOD 2004, Jun. 13-18, 2004, Paris, France, 12 pages.
Hewlett-Packard, "Tandem Capacity Model (TCM) Manual", Part No. 522695-006, Aug. 2008, 321 pages.
Navin Kabra et al., "Efficient Mid-Query Re-Optimization of Sub-Optimal Query Execution Plans", SIGMOD 1998, Seattle, Washington, p. 106-117.
Gang Luo et al, "Toward a Progress Indicator for Database Queries", ACM SIGMOD 2004, Jun. 13-18, 2004, Paris, France, p. 791-802.

(Continued)

Primary Examiner — Thanh Vu

(57) ABSTRACT

A method of producing a representation of the progress of a process being performed on a database may be embodied in a data processing system. The method may include obtaining for each of a plurality of subprocesses included in the database process an estimated rate of using a system resource during execution of the subprocess and an estimated volume of data to be processed. The actual rate of using the first system resource and the actual volume of data processed during execution of the at least one subprocess may be determined for at least one of the plurality of subprocesses. An output signal may be generated that is representative of the estimated and actual rates and the estimated and actual volumes of data for the at least one subprocess.

21 Claims, 4 Drawing Sheets

(56) References Cited

OTHER PUBLICATIONS

Gang Luo et al., "A Non-blocking Parallel Spatial Join Algorithm", Proceedings of the 18th International Conference on Data Engineering (ICDE'02), 2002, IEEE, 9 pages.

Baoning Niu et al., "Workload Adaptation in Autonomic DBMSs", Proceedings of the 2006 Conference of the Center for Advanced Studies on Collaborative Research, 2006, 14 pages.

Zhaohui Yao et al., "Adaptive Cost Estimation for Client-Server Based Heterogeneous Database Systems", University of Maryland Institute for Advanced Computer Studies Report No. UMIACS-TR-96-37, 1996, University of Maryland, College Park, Maryland, p. 1-19.

Surajit Chaudhuri et al., "Primitives for Workload Characterization and Implications for SQL", Proceedings of the 29th VLDB Conference, 2003, Berlin, Germany, 12 pages.

Surajit Chaudhuri et al., "When Can We Trust Progress Estimators for SQL Queries?", SIGMOD 2005, Jun. 14-16, 2005, Baltimore, Maryland, 12 pages.

Indira Subramanian et al., "Meeting Performance Goals With the HP-UX Workload Manager", Proceedings of the 1st Conference on Industrial Experiences With Systems Software (WIESS), 2000, 2 pages.

Microsoft Corporation, "The SQL Server 2000 Workload Governor", 2 pages.

Teradata, "Teradata Dynamic Workload Manager User Guide", Release 06.02.00, Sep. 2006, p. 1, 2, 106-122, 160, 161.

Oracle, "Oracle Database Administrator's Guide", Mar. 2008, p. 1, 2, 710-714.

IBM, "Query Patroller Administration and User's Guide", DB2 Version 9, 2006, International Business Machines Corporation, p. 2, 3, 67, 68, 90-92, 123-139, 183, 184, 238-262.

* cited by examiner

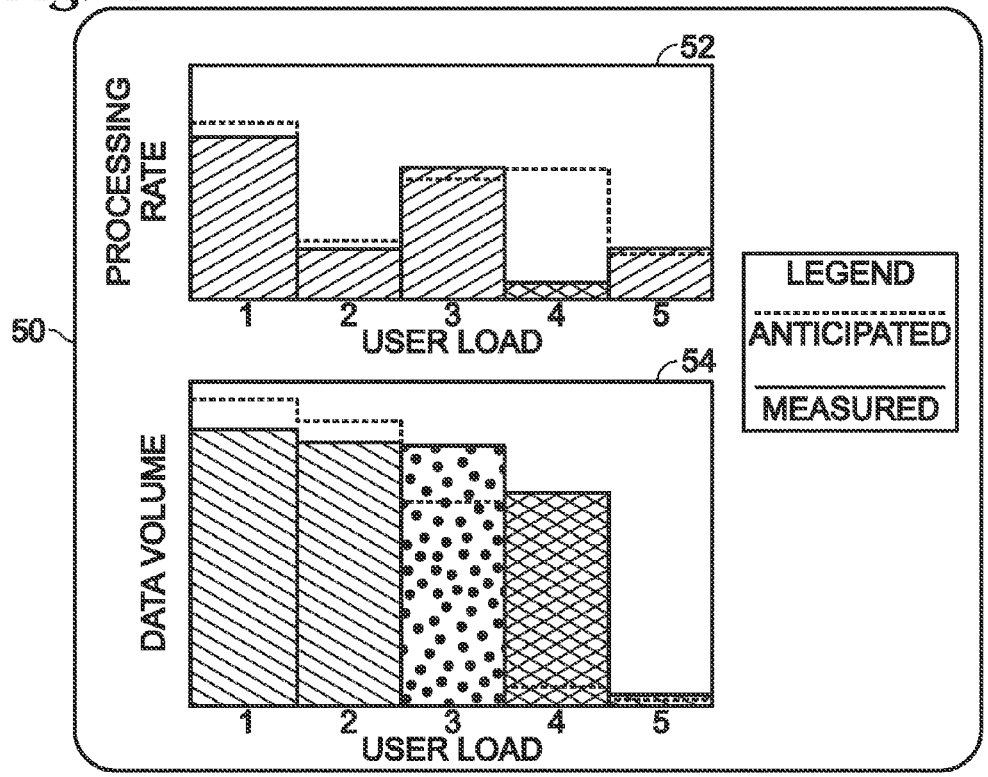
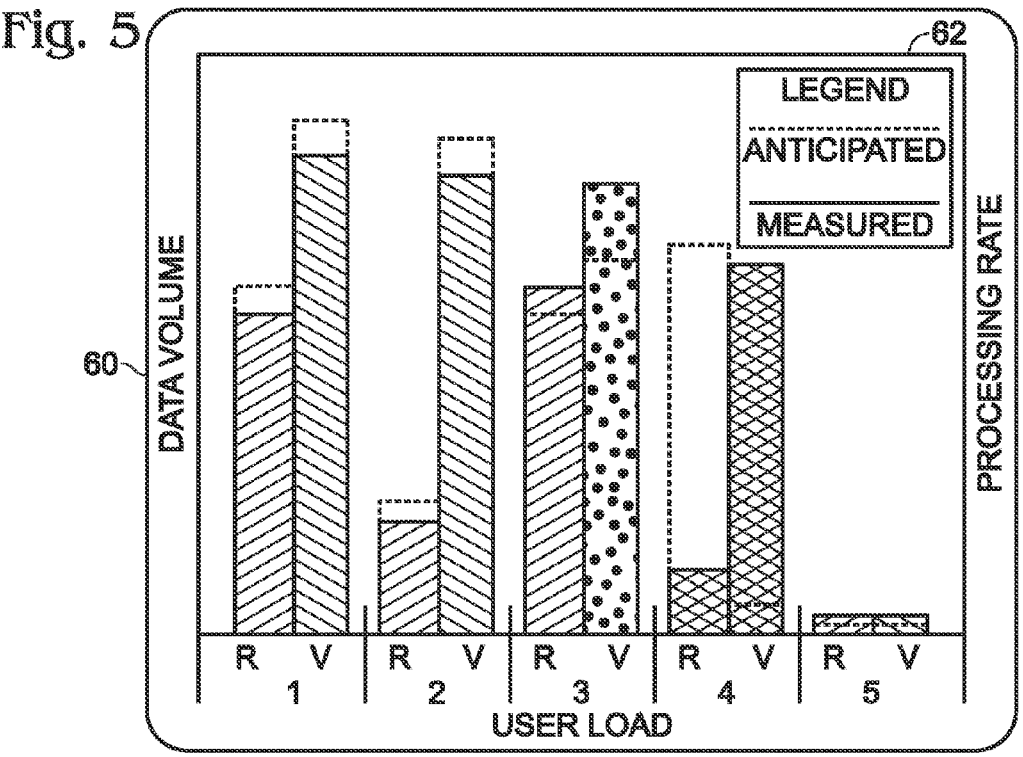

PRODUCING A REPRESENTATION OF PROGRESS OF A DATABASE PROCESS

BACKGROUND

A database is a collection of information. A relational database is a database that is perceived by its users as a collection of tables. Each table arranges items and attributes of the items in rows and columns respectively. Each table row corresponds to an item (also referred to as a record or tuple), and each table column corresponds to an attribute of the item (referred to as a field, an attribute type, or field type). To retrieve information from a database, the user of a database system constructs a query. A query contains one or more operations that specify information to retrieve, manipulate, or update from the database. The system scans tables in the database and processes the information retrieved from the tables to execute the query.

A database system can optimize a query by arranging the order of query operations. There may be various conditions that make it difficult to analyze the progress or estimate the completion time of complex database queries, particularly on a parallel database system. One condition may be that different portions of a query plan may be tasked with completing different amounts of work. For example, a query might include a file scan operator that sequentially reads tuples from a table and selects only a relatively small portion of these tuples to be processed by a subsequent sort operator. Also, different portions of a query plan may process tuples and utilize resources at different rates. For example, a sort operator that writes external runs to disk will process fewer tuples per second and than an operator that performs a sequential scan of an in-memory index.

Even a given operator's resource usage and tuple processing rates may vary depending upon resource availability and on the volume of data to be processed. For example, a sort operator will process fewer tuples per second and incur more I/O operations when it needs to write external runs to disk than it would if the data to be sorted fit into memory. Progress may also be difficult to analyze if the database is a parallel database. Then multiple instances of some, but not all, of the system operators may execute simultaneously. For example, a file scan of a table that is partitioned across multiple nodes may execute in parallel across those nodes, but an operator that selects the first ten tuples returned by sort operation may consist of a single instance that must wait until the sort has completed. Combined, these factors make it difficult to model the interactions of all the operators that comprise a complex query.

BRIEF DESCRIPTION OF THE DRAWINGS

Features and advantages of examples of systems, methods and devices will become apparent by reference to the following detailed description and drawings.

FIG. 4 is an illustration of a further example of a user display of information related to processing by a data processing system in accordance with an embodiment of the invention.

FIG. 5 is an illustration of yet a further example of a user display of information related to processing by a data processing system in accordance with an embodiment of the invention.

DETAILED DESCRIPTION

A database system may perform various processes. The primary purpose of a database system may be to process queries that allow information stored in a database to be retrieved and manipulated by a user. One or multiple queries may be processed at a time, so that workloads of queries may be monitored, as well as individual queries. Further, database maintenance may involve processes concurrently with or separately from processing queries. For example, the data in the database may need to be revised, added to or deleted. Given the difficulties that may exist in modeling a complex query or workload, a system may be provided that recognizes that both resource utilization rates and data volumes may change over the lifetime of a process and characterizes progress as a function of how both the resource utilization rates and also the amount of "work to be done" outstanding vary across the lifetime of a process. Considering both of these explicitly allows a user to anticipate how both resource utilization and the amount of work to be done may vary across the lifetime of the process without requiring individual operators that operate during the process to be instrumented.

Figure 1:
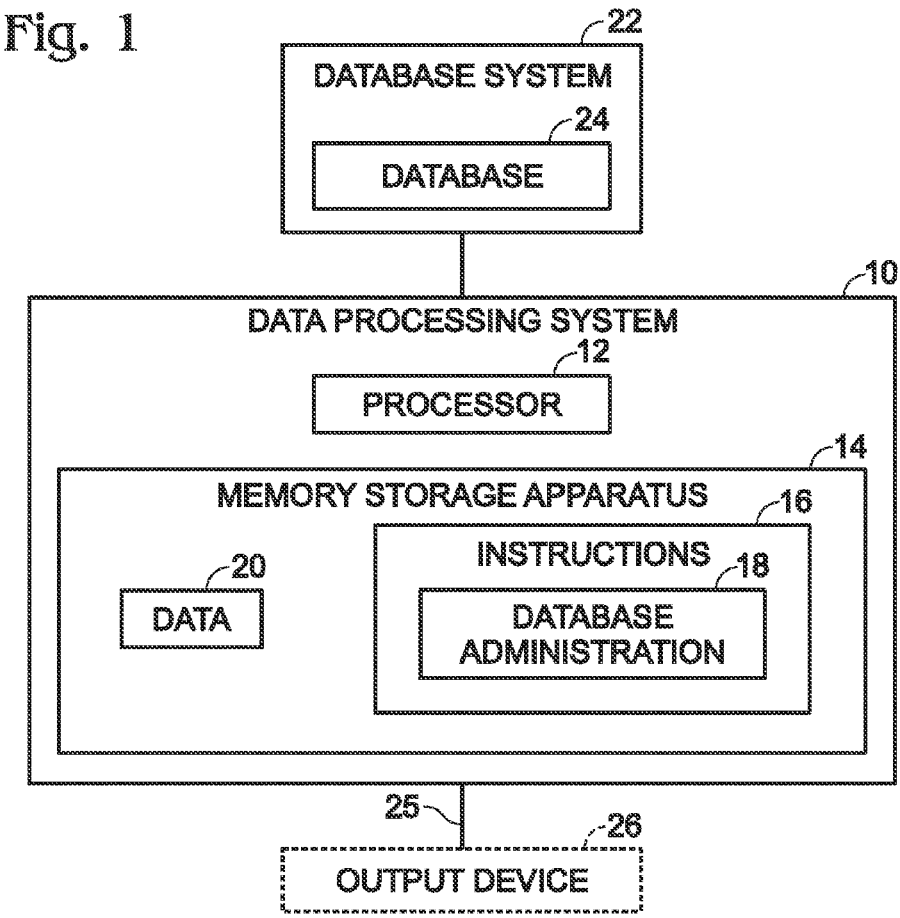
FIG. 1 is a block diagram depicting an example of a data processing system in accordance with an embodiment of the invention.

FIG. 1 illustrates an example of a data processing system 10 that may be used to producing a representation of progress of a database process being performed on data in a database system, which representation may be used to provide notification of the progress to a user. Data processing system may include one or more computer systems, including any intercommunication devices such local and wide area networks. Accordingly, the data processing system may include hardware, software, and firmware. For example, hardware may include a central processing unit (CPU) or processor 12, a memory storage apparatus 14, and input/output connections, chipsets, and other hardware components, not specifically shown. The memory storage apparatus may be any suitable type of storage device or devices resident in or in association with one or more of the computer systems, and may include non-volatile memory and volatile memory. The non-volatile memory may include executable software instructions 16 for execution by the processor, including instructions for an operating system and other applications, such as instructions for administering the data base, shown as database administration 18, as well as storing data 20.

Data processing system 10 may be in communication with a database system 22 including a database 24. Data processing system 10 and database system 22 may be on the same computer system or they may be on separate computer systems. Data processing system may also provide an output signal, such as an output signal on a communication link 25 that may be coupled to an output device 26. Output device 26 may be any suitable device for outputting data, such as a printer, monitor, or other device for communicating information to a user. Communication link 25 may be a terminal or port in the data processing system, it may be a wired or wireless direct connection between the data processing system and the output device, or it may include one or more networks or other computer systems coupling the data processing system to the output device.

Figure 2:
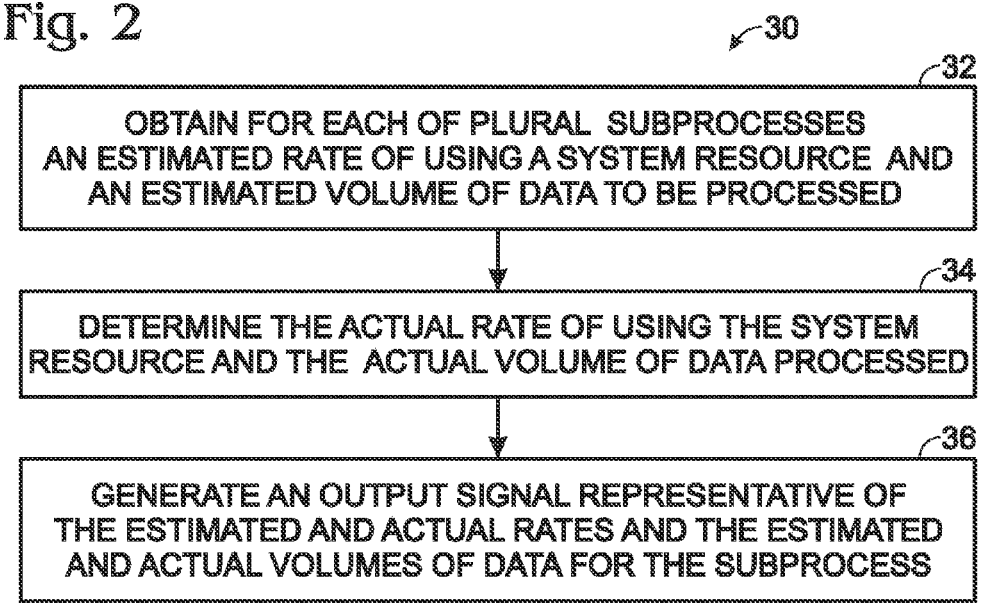
FIG. 2 is a flow chart of an example of a method of producing a representation of the progress of a process being performed on a database in accordance with an embodiment of the invention.

An example of a method 30 for producing a representation of the progress of a database process being performed on data in a database system 22 is illustrated in the flow chart of FIG. 2. Such a method may be implemented on data processing system 10. The method may include in a step 32 obtaining, for each of a plurality of subprocesses included in the process, an estimated rate of using a system resource during execution of the subprocess and an estimated volume of data to be processed. A process may be executing a query or other workload by the database system. The workload may include various processes performed on the database 24, such as running multiple queries or updating the database. In this example, subprocesses may be executing individual queries or groups of queries, such as queries of a type or queries from a particular user source. In an example where the process is the execution of a query, subprocesses may be the functions of operators that execute the query, such as CPU processing, reading, writing, sorting, joining, and the like.

In a step 34, the actual rate of using the first system resource and the actual volume of data processed during execution of the one or more subprocesses may be determined for at least one of the plurality of subprocesses. An output signal representative of the estimated and actual rates and the estimated and actual volumes of data for the one or more subprocesses may then be generated in a step 36.

In some examples, a determination may also be made as to whether the actual rate is different than the estimated rate by at least a rate threshold. A determination may also be made as to whether the actual volume is more than the estimated volume by at least a volume threshold. In such cases, outputting of information may then include an indication of any difference between the estimated and actual rates and/or any difference between the estimated and actual volumes of data. A determination may also be made as to whether the actual rate is different than the estimated rate by at least a rate threshold, as to whether the actual volume is more than the estimated volume by at least a volume threshold, or both.

Figure 3:
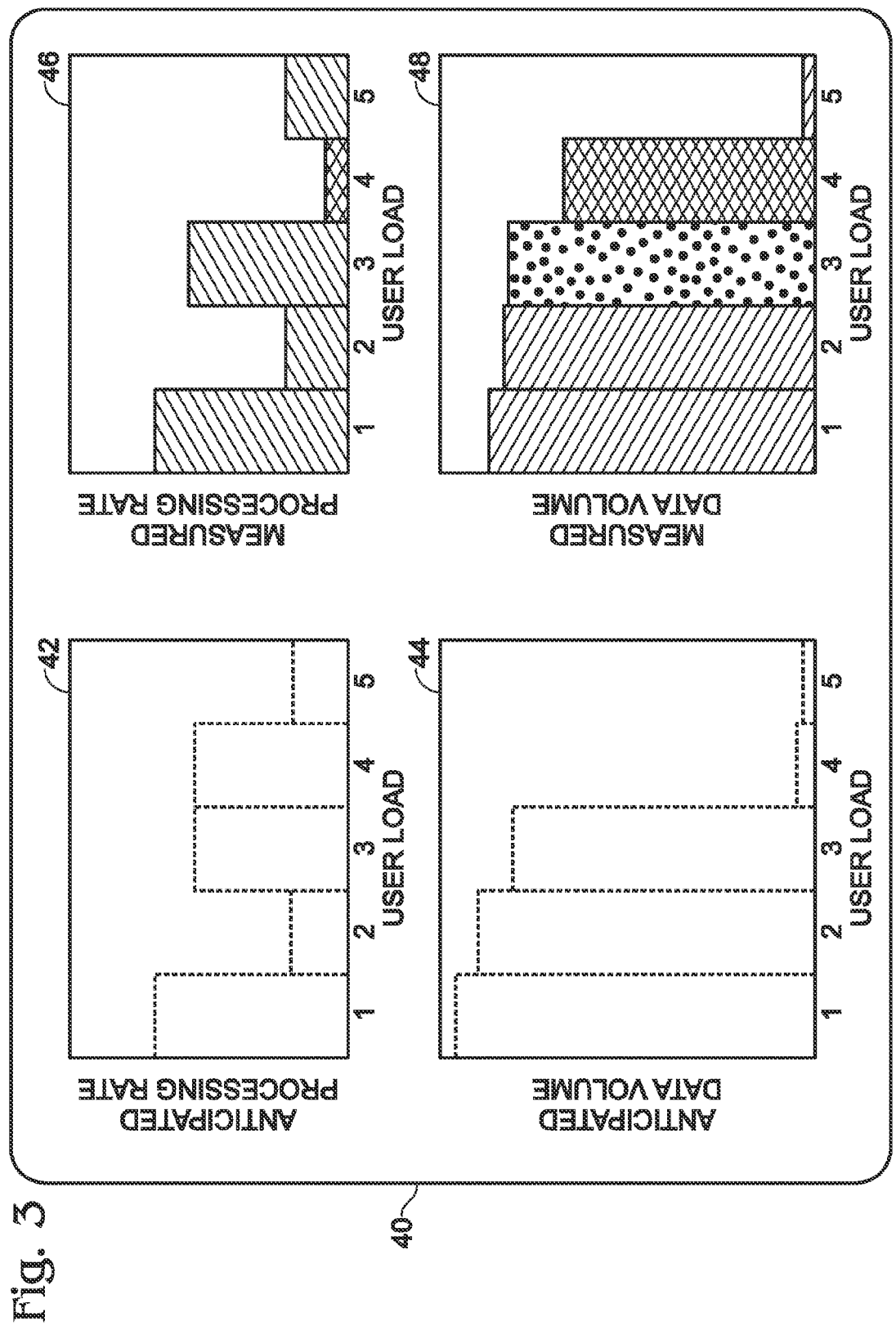
FIG. 3 is an illustration of an example of a user display of information related to processing by a data processing system in accordance with an embodiment of the invention.

As mentioned, FIG. 3 is an illustration of an example of a user display 40 of information related to processing by a data processing system that may be included in an output signal, such as would be displayed on a computer monitor or printed on a sheet of paper by output device 26. These examples include four bar charts representative of the progress of data processing system 10. This information may be shown in other formats instead of or in addition to bar charts. For example, it could be shown in text, tables or graphs, or a combination of these.

In the upper left of display 40 is a chart 42 illustrating the anticipated (estimated) processing rate for each of several user loads. The processing rate may be throughput per unit time for the subprocesses, such as the numbers of queries per unit time, rate of use of the CPU, rate of memory accesses, or other appropriate metric. These loads may be query operations, or groups of queries or other subprocesses included in a user load or work load. The bars for each load are shown in dashed lines to facilitate illustration in black and white. The bars may also be in color or other pattern, and each load may have a different color or different pattern. Although not shown, the information presentation may also be annotated to indicate "risks" such as stages at which histogram errors may propagate during execution of the user loads.

Below chart 42 is a bar chart 44 illustrating the anticipated data volume. Data volume may be in units of data, such as the number of data elements, rows or tuples, or columns of data accessed. The bars are shown in outline form, as for the anticipated processing rate bars. These bars could be shown in the same or different indications as the anticipated processing rate bars, such as colors or patterns.

To the right of charts 42 and 44 in display 40 are corresponding charts of measured (actual) information. To the immediate right of chart 42 is a chart of measured (actual) processing rate for each of the user loads shown in chart 42. These charts may have visual indications that are the same or different than those used for the corresponding bars in chart 42. In this example, the bars for loads 1, 2, 3, and 5 have the same pattern of hatch lines angled from lower left to upper right. These bars have measured rates that are close to the anticipated rates shown in chart 42, and could, for example, be given a color to represent this, such as the color green.

The measured rate for the fourth load is seen in this example to be much less than the anticipated rate. It has a cross-hatch pattern that may represent a distinctive color, such as red. For each user load, one or more thresholds may be established to indicate the degree to which the measured rate differs from the anticipated rate. For example, if the difference exceeds a first threshold in a positive direction (is less than), a first indicator may be used, such as the color yellow. If the difference exceeds a second threshold a second indicator, such as the color red, may be used. Also, different patterns or colors may be used to indicate whether the differences are positive or negative. In this way, the display may provide a quick visual indicator of the difference (and direction of difference) between the anticipated and measured values. In some examples, then, a single chart for processing rates, like chart 46, may provide a visual indication of measured as well as a relative indication about how the measured values compare to the anticipated values.

Below chart 46 is a chart 48 for measured data volume. It is seen that the bars for loads 1, 2, and 5 have the same pattern, i.e., hatching extending from the lower right to the upper left. The remarks applying to bar charts 42 and 46 apply generally to bar charts 44 and 48 as well. Thus, since it is seen that the anticipated and measured data volumes for user loads 1, 2, and 5 are similar, the given pattern may be replaced with a color, such as the color green. The bar for user load 3 is seen to be in a polka-dot pattern. If the measured value is more than the anticipated value by a first threshold, then this pattern may indicate that, as would an intermediate color such as yellow. The bar for load 4 is seen to also be cross-hatched lines. This may correspond to a situation where the measured value exceeds the anticipated value by a second threshold. Yet a different color may be used if the measured value was less than the anticipated value by a third threshold.

FIG. 4 is an illustration of a further example of a user display 50 of an output signal containing information related to processing by a data processing system. Display 50 is similar to display 40 except that it includes only one processing rate chart 52 and one data volume chart 54. In this example, chart 52 includes the anticipated bars overlaying the measured bars for processing rate. Similarly, chart 54 includes the anticipated bars overlaying the measured bars for data volume. The anticipated bars are shown in dashed outline and the measured bars are shown with the patterns shown in charts 46 and 48. Display 50 thus shows the same information as display 40, but uses two charts to display it.

FIG. 5 is an illustration of yet a further example of a user display 60 of an output signal containing information related to processing by a data processing system. In this example, display 60 includes a single chart 62 containing the information included in the charts in displays 40 and 50. In particular, each user load includes two bars, one having the designation "R" for processing rate information, and one having the designation "V" for data volume. The comments made with respect to the charts in displays 40 and 50 apply to chart 60. The anticipated and measured bars are as indicated in charts 52 and 54. It is therefore seen that both the anticipated and measured processing-rate and data-volume information may be readily provided in a single chart. Review of a chart like chart 60 thus may be used by a user to quickly determine the status and progress of the database process, both for the process as a whole through the combinations of information, as well as for each of the identified subprocesses included in the process.

Figure 6:
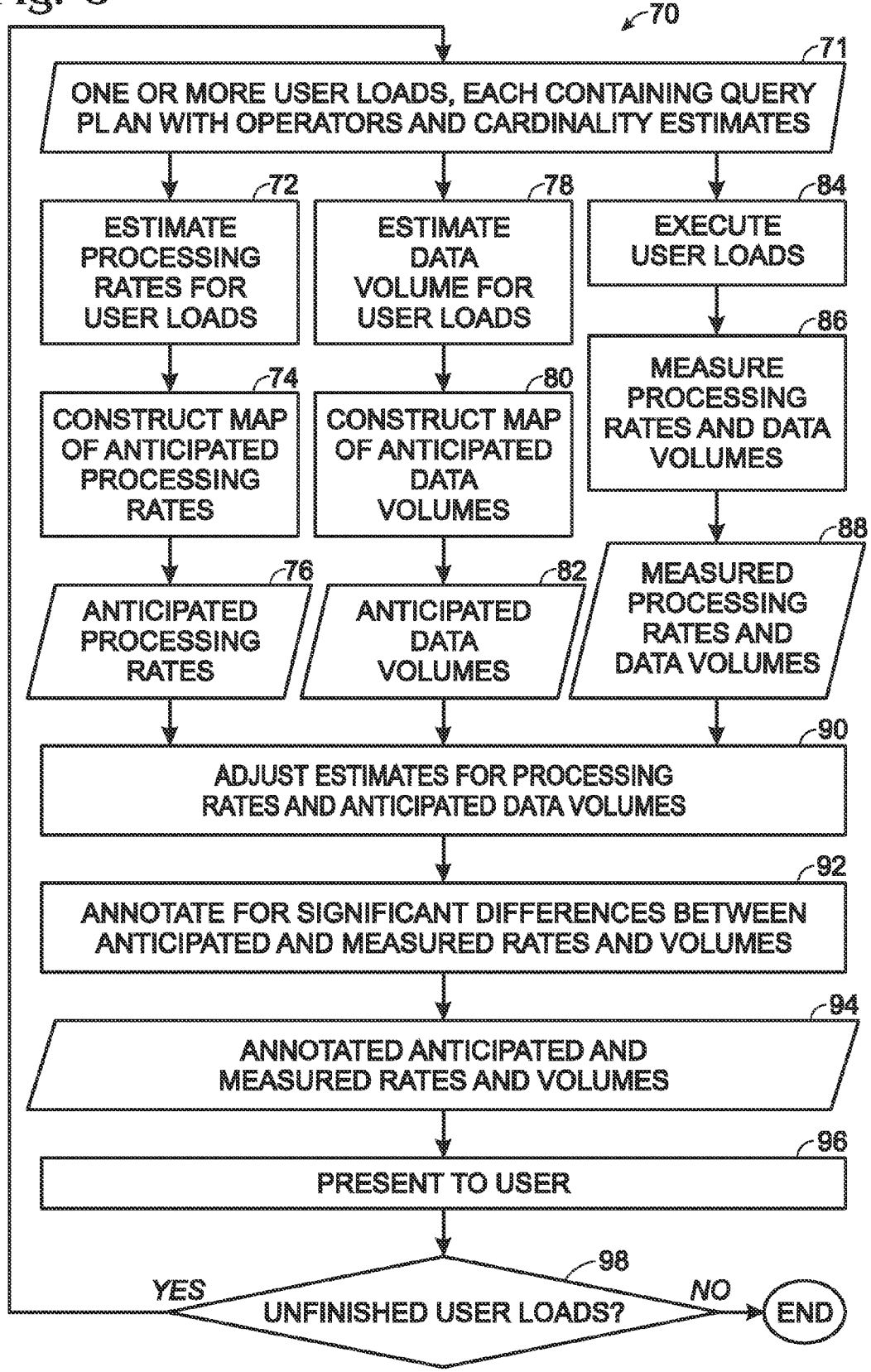
FIG. 6 is a flow chart of a further example of a method of producing a representation of the progress of a process being performed on a database in accordance with an embodiment of the invention.

FIG. 6 is a flow chart of a further example of a method 70 of producing a representation of progress of a database process in accordance with an embodiment of the invention. One or more user loads 71, each containing a query plan with operators and cardinality estimates may be received or identified in a query queue. With the existence of these loads identified, three parallel or series paths may be followed. In a first path, the processing rates for one or more user loads may be estimated in a step 72. A map of anticipated processing rates may be constructed in a step 74. The resulting map, represented by box 76, may correspond to a chart, such as chart 42, 52, or 62.

In a second path, the data volume may be estimated for one or more of the user loads in a step 78. A map may then be constructed in a step 80 of the anticipated data volumes. The resulting map, represented by box 82, may correspond to a chart, such as chart 44, 54, or 62.

In a third path, the user load may be executed in a step 84. The actual processing rates and data volumes for one or more of the user loads may then measured in a step 86. Although shown as a sequential step, the measuring may be performed while the user load is being executed. During the execution of the user loads, the measured processing rates and data volumes may be stored and corresponding maps may be constructed, as represented by box 88. Early in the execution of the user loads, the measured processing rates and data volumes may be used to construct maps of this information. The maps of actual rates and volumes may be combined with the maps of the anticipated rates and volumes or they may be displayed separately. Examples are illustrated in charts 46, 48, 83, 54, and 62 of FIGS. 3, 4, and 5. At any time during the execution of the user loads, the anticipated processing rates and data volumes may be revised in a step 90, and the revisions may be based at least in part on the measured values.

In a step 92, any differences between the anticipated and measured processing rates and between the anticipated and measured data volumes for the different user loads may be determined. The differences may be compared to one or more thresholds, as has been described, and the maps of the processing rates and data volumes may be annotated, such as by providing different visual indicators, such as different chart patterns or colors, may be applied to the maps. The visual indicators may also show degrees of difference on a continuous scale, rather than on an incremental scale, such as through the use of thresholds. Box 94 represents the resulting annotated anticipated and measured processing rates and data volumes for the one or more user loads.

An output signal may then be produced that is representative of the annotated anticipated and measured processing rates and data volumes. Such an output signal may then be presented to the user in a step 96. This may be accomplished by outputting the information on communication link 25 to output device 26. A determination may then be made in a step 98 as to whether there are any remaining unfinished user loads 71, whether or not there has been a significant change in the set of user loads being executed. If there are remaining user loads and it is desired to update the information presented to the user, then the method may be repeated. If not, the method may be terminated, or a load input or queue may be monitored.

It is seen that a system or method as described may take into account a situation where both resource utilization rates and data volumes may change over the lifetime of a query. Progress may then be characterized as a function of how both the resource utilization rates and also the amount of "work to be done" outstanding may vary across the lifetime of a query. Considering these may be used to anticipate how resource utilization and the amount of work to be done may vary during the lifetime of the execution of a process, such as a query plan, without requiring individual operators to be instrumented.

An output signal representative of a display or other presentation of the progress may be output to a user, such as one of those described. Such a display may provide an intuitive presentation of the progress of a completion of a complex query or other process. Basic presentation of a query plan, for example, in terms of anticipated resource usage rates and anticipated data volumes may give an intuitive view of expected query progress. The presentation may be labeled to indicate areas of "risk" that may be known. An analysis of the progress of a running query in terms of multiple resources may be produced, and different user loads may be accounted for in parallel (on the same presentation). Such a presentation also may account for the fact that different types of query operators may place different requirements upon different types of resources and that resource usage rates and data processing rates may depend upon the amount of data to be processed, the type of operator, the degree of parallelism, or a combination of these. An extended data structure may be incrementally populated with results from monitoring multiple instances of a query, yielding a more detailed and accurate view of query progress. Measurement data may also provide feedback to database executor developers with regard to query execution robustness, or to database query optimizer developers with regard to query optimization robustness. The combination of both anticipated (expected) and measured (actual) data may inform workload management decisions.

The examples illustrated may be seen to take multiple measures into account, and also may be used to distinguish between metrics that reflect resources that can be used by multiple queries at a time (e.g., network usage measured by the number of messages exchanged) and resources for which queries take turns at possession (e.g., CPU usage as measured by execution time). This may enable users to better model the nature of interactions between queries executing in the system, which in turn may enable them to give more accurate analysis of the state of the system and the status of an individual query.

We claim:

1. A method of producing a representation of a progress of a database process being performed on data in a database system, the method comprising:
    obtaining for each of a plurality of subprocesses included in the database process an estimated rate of using a system resource during execution of the subprocess and an estimated volume of data to be processed;
    determining for at least one of the plurality of subprocesses an actual rate of using the system resource and an actual volume of data processed during execution of the at least one subprocess; and generating an output signal representative of the estimated and actual rates and the estimated and actual volumes of data for the at least one subprocess.

2. The method of claim 1, further comprising determining whether the actual rate for the at least one subprocess is different than the estimated rate for the at least one subprocess.

3. The method of claim 2, wherein generating the output signal includes generating the output signal representative of the estimated and actual rates and the estimated and actual volumes of data for the at least one subprocess, and an indication of a difference between the estimated and actual rates for the at least one subprocess.

4. The method of claim 1, further comprising determining whether the actual rate for the at least one subprocess is different than the estimated rate for the at least one subprocess by at least a rate threshold.

5. The method of claim 1, further comprising determining whether the actual volume for the at least one subprocess is different than the estimated volume for the at least one subprocess.

6. The method of claim 5, wherein generating the output signal includes generating the output signal including the estimated and actual rates and the estimated and actual volumes of data for the at least one subprocess, and an indication of a difference between the estimated and actual volumes for the at least one subprocess.

7. The method of claim 1, further comprising determining whether the actual volume for the at least one subprocess is different than the estimated volume for the at least one subprocess by at least a volume threshold.

8. The method of claim 1, wherein the estimated rate for the at least one subprocess includes at least one selected from among an estimated number of queries per unit time, an estimated rate of use of a CPU, and an estimated rate of memory access, and
wherein the actual rate for the at least one subprocess includes at least one selected from among an actual number of queries per unit time, an actual rate of use of a CPU, and an actual rate of memory access.

9. A data processing system for producing a representation of a progress of a database process being performed on data in a database system having a system resource, comprising:
memory storage apparatus for storing data and processor-readable instructions; and
a processor for executing the processor-readable instructions for:
obtaining for each of a plurality of subprocesses included in the database process an estimated rate of using the system resource during execution of the subprocess and an estimated volume of data to be processed;
determining for at least one of the plurality of subprocesses an actual rate of using the system resource and an actual volume of data processed during execution of the at least one subprocess; and
generating an output signal representative of the estimated and actual rates and the estimated and actual volumes of data for the at least one subprocess.

10. The data processing system of claim 9, wherein the processor is further for executing the processor-readable instructions for determining whether the actual rate for the at least one subprocess is different than the estimated rate for the at least one subprocess.

11. The data processing system of claim 10, wherein the processor is further for executing the processor-readable instructions for generating the output signal representative of the estimated and actual rates and the estimated and actual volumes of data for the at least one subprocess, and an indication of a difference between the estimated and actual rates for the at least one subprocess.

12. The data processing system of claim 9, wherein the processor is further for executing the processor-readable instructions for determining whether the actual rate for the at least one subprocess is different than the estimated rate for the at least one subprocess by at least a rate threshold.

13. The data processing system of claim 9, the processor is further for executing the processor-readable instructions for determining whether the actual volume for the at least one subprocess is different than the estimated volume for the at least one subprocess.

14. The data processing system of claim 13, wherein the processor is further for executing the processor-readable instructions for generating the output signal including the estimated and actual rates and the estimated and actual volumes of data for the at least one subprocess and an indication of a difference between the estimated and actual volumes for the at least one subprocess.

15. The data processing system of claim 9, wherein the processor is further for executing the processor-readable instructions for determining whether the actual volume for the at least one subprocess is different than the estimated volume for the at least one subprocess by at least a volume threshold.

16. A computer-readable storage device readable by one or more computer systems and having embodied therein a program of computer-readable instructions that, when executed by the one or more computer systems, provide for:
obtaining for each of a plurality of subprocesses included in a database process an estimated rate of using a system resource during execution of the subprocess and an estimated volume of data to be processed;
determining for at least one of the plurality of subprocesses an actual rate of using the system resource and an actual volume of data processed during execution of the at least one subprocess; and
generating an output signal representative of the estimated and actual rates and the estimated and actual volumes of data for the at least one subprocess.

17. The computer-readable storage device of claim 16, wherein the program further provides for determining whether the actual rate for the at least one subprocess is different than the estimated rate for the at least one subprocess.

18. The computer-readable storage device of claim 17, wherein the output signal further includes an indication of a difference between the estimated and actual rates for the at least one subprocess.

19. The computer-readable storage device of claim 16, wherein the program further provides for determining whether the actual volume for the at least one subprocess is different than the estimated volume for the at least one subprocess.

20. The computer-readable storage device of claim 16, wherein the output signal further includes an indication of a difference between the estimated and actual volumes for the at least one subprocess.

21. The computer-readable storage device of claim 16, wherein the program further provides for determining whether the actual volume for the at least one subprocess is different than the estimated volume by at least a volume threshold for the at least one subprocess.

* * * * *